(12) United States Patent
Roberts et al.

(10) Patent No.: US 7,289,738 B1
(45) Date of Patent: Oct. 30, 2007

(54) QUANTUM OPTICAL COMMUNICATIONS SYSTEM

(75) Inventors: Mark W. Roberts, San Diego, CA (US); Markham E. Lasher, La Jolla, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 672 days.

(21) Appl. No.: 10/705,799

(22) Filed: Nov. 10, 2003

(51) Int. Cl.
*H04B 10/00* (2006.01)
(52) U.S. Cl. .................................. 398/140; 398/182
(58) Field of Classification Search ............ 398/140, 398/141, 182; 356/450, 477
See application file for complete search history.

(56) References Cited

U.S. PATENT DOCUMENTS

| | | | |
|---|---|---|---|
| 5,119,383 A * | 6/1992 | Duling et al. ............... | 372/18 |
| 6,678,054 B1 * | 1/2004 | Dress et al. ................ | 356/450 |
| 6,982,822 B2 * | 1/2006 | Teich et al. ................ | 359/330 |
| 7,046,366 B2 * | 5/2006 | Ozeki et al. ................ | 356/477 |
| 7,126,691 B2 * | 10/2006 | Gat ............................. | 356/450 |

* cited by examiner

*Primary Examiner*—Christina Leung
(74) *Attorney, Agent, or Firm*—Peter A. Lipovsky; Allan Y. Lee

(57) ABSTRACT

A communication system employs quantum entanglement by projecting photons through a nonlinear crystal. Some become parametrically down-converted into signal and idler photon pairs. The signal photons are projected to a receiver and the idler photons to a transmitter. The transmitter operator can alter the time width and a majority of the center wavelengths of the idler photons via a collapse event in the transmitter. Because of quantum entanglement, a corresponding change in the time width and center wavelengths of the signal photons as received at the receiver results. The purposeful causation of the collapse event or a lack of such purposeful causation can be used for binary communication. In addition, the sensing of an atmospheric condition may be performed by equating changes in received signal photon characteristics with changes in collapse conditions in the atmosphere.

13 Claims, 5 Drawing Sheets

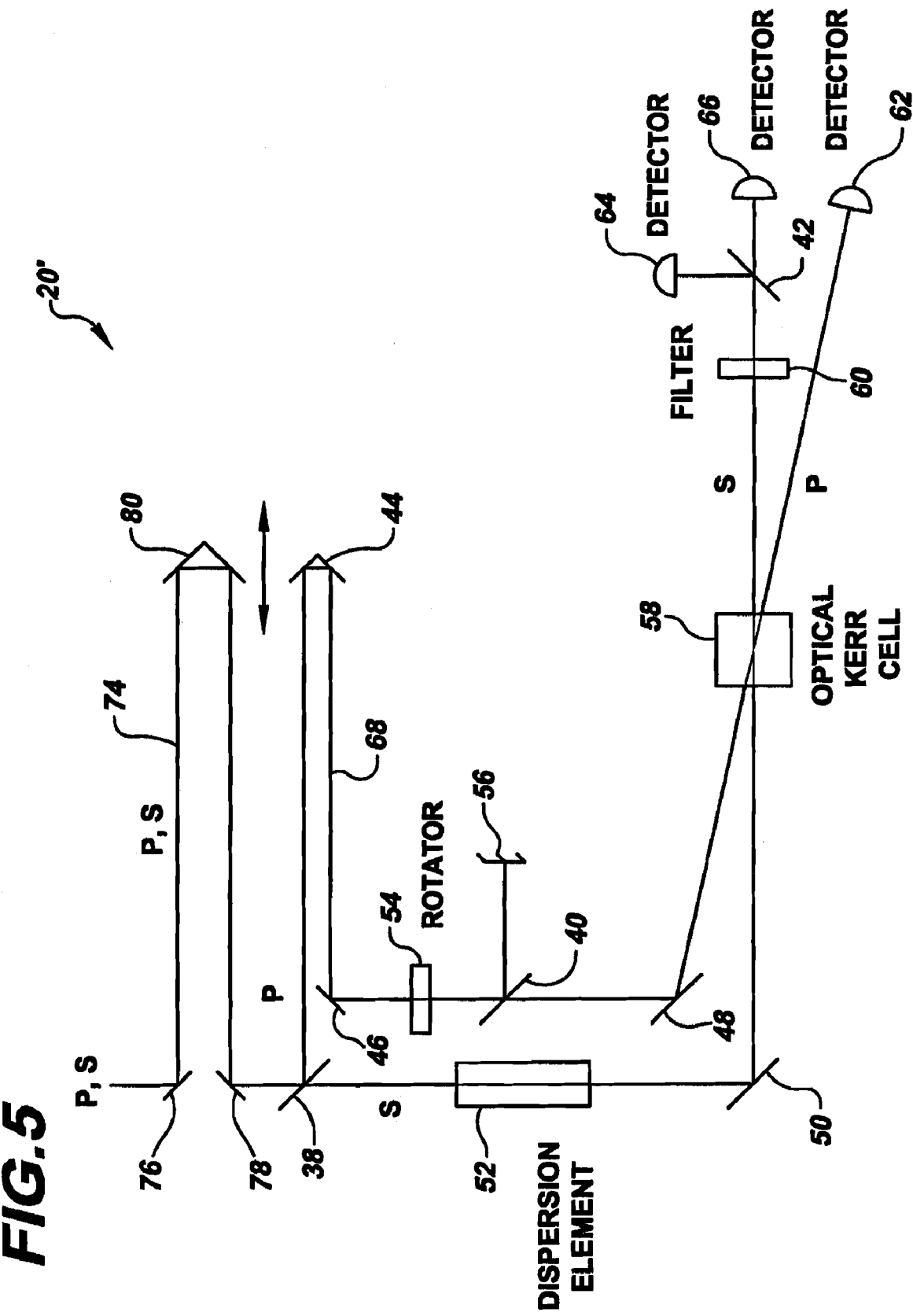

QUANTUM OPTICAL COMMUNICATIONS SYSTEM

BACKGROUND OF THE INVENTION

This invention relates generally to communications and, in particular, to a communications system employing the principle of quantum entanglement.

The constant desire for "greater bandwidth" reflects an ever increasing demand placed on modern communication systems to rapidly transfer large amounts of information from one place to another. Classical communication techniques have been quite effective in meeting this demand, but these techniques are now approaching their theoretical limits.

It is therefore considered desirable to explore non-traditional approaches to enhance communication.

SUMMARY

A non-traditional communications system utilizes the quantum mechanics principle of quantum entanglement. An example communication system employing quantum entanglement includes the steps of projecting a pulse of photons through a nonlinear crystal. Photons making up a portion of this projected pulse are each parametrically down-converted into a signal and idler quantum-entangled photon pair. This conversion results in a series of signal photons and a series of idler photons. Another portion of the projected pulse is not down-converted, resulting in a series of non down-converted pulse photons corresponding to the projected pulse.

The series of signal photons and series of non down-converted pulse photons are projected to a receiver.

The series of idler photons are projected to a transmitter. The transmitter contains a collapse condition wherein a time width of each of the idler photons is altered and wherein a majority of the center wavelengths of each of the idler photons is altered. Because of quantum entanglement, a change to an idler photon results in a corresponding change to a corresponding signal photon as received at the receiver. The transmitter also has a non-collapse condition wherein the time width and center wavelength of each of the idler photons is left unaltered and wherein the time width and center wavelength of each of the corresponding signal photons as received at said receiver are left unaltered. An example of such a collapse condition is a measurement of the frequency of the idler photons, however such a collapse condition may exist upon encountering certain atmospheric conditions such as atmospheric aerosols.

The receiver is used to provide detection of whether the signal photons corresponding to the projected pulse and as received at said receiver have been altered or not. This detection is enhanced by projecting the altered and unaltered signal photons through a nonlinear element that enhances the differences between the two types of signal photons. A cumulative time distribution of the series of signal photons as received at the receiver is then assessed for each pulse or for a number of pulses to determine whether the signal photons have been altered or not.

The purposeful causation of the collapse event or a lack of such purposeful causation can be used for binary communication. In addition, the sensing of an atmospheric condition may be performed by equating changes in received signal photon characteristics with changes in collapse conditions in the atmosphere.

Other objects, advantages and new features of the invention will become apparent from the following detailed description of the invention when considered in conjunction with the accompanied drawings.

BRIEF DESCRIPTION OF THE DRAWINGS

FIG. 5 shows an alternative receiver.

DESCRIPTION

A communications system to be further described herein includes a pulse source, a transmitter, and a receiver. The optical path length from the source to the receiver is made to be slightly greater than the optical path length from the source to the transmitter.

Figure 1:
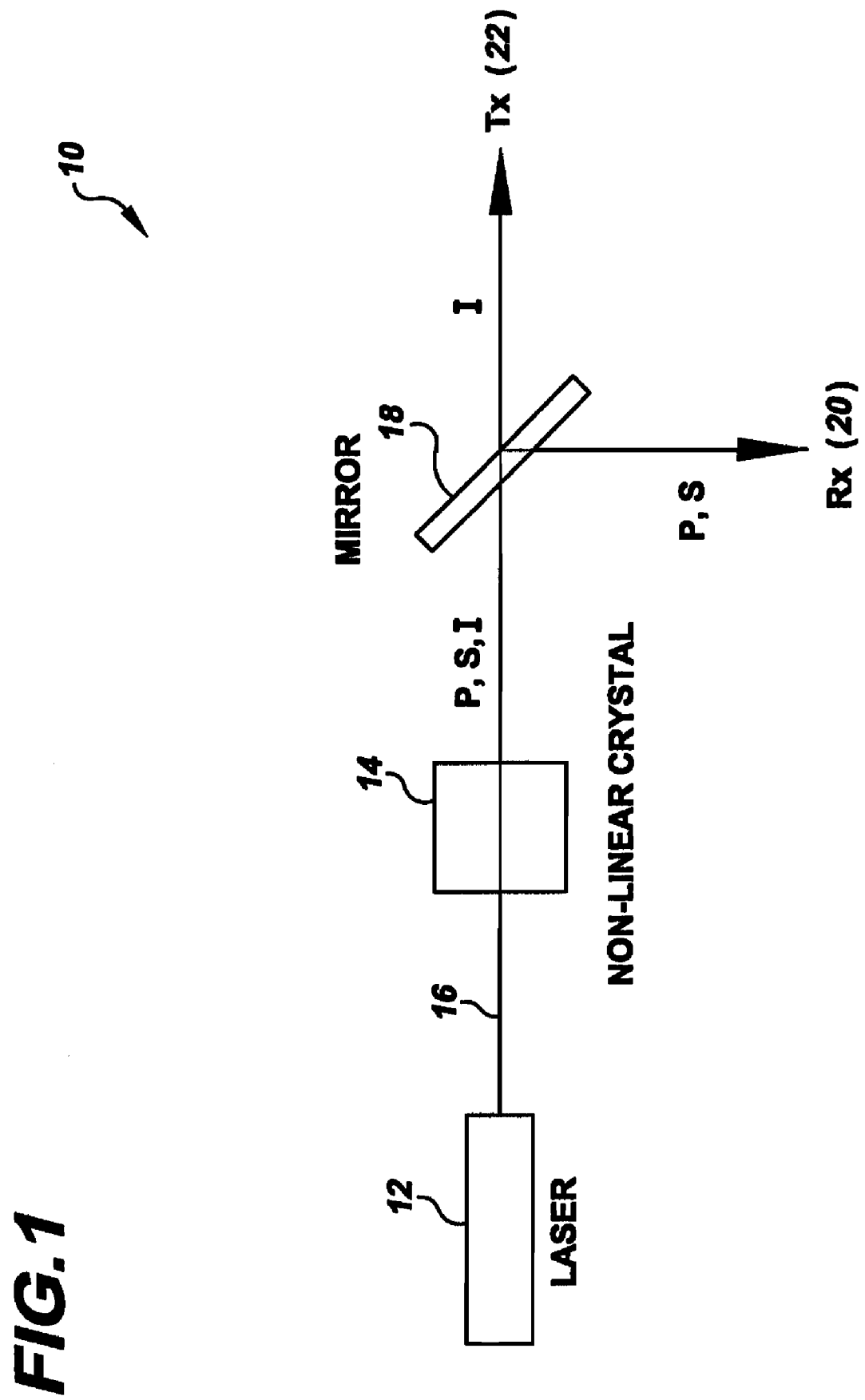
FIG. 1 illustrates an exemplary pulse source.

Referring now to FIG. 1, an example of pulse source 10 includes a laser 12, a nonlinear crystal 14, and a wavelength selective mirror 18.

The laser is chosen to output pulses of photons. Suitable example pulses have full width at half maximum (FWHM) of approximately 200 femtoseconds. A suitable example laser pulse repetition frequency (PRF) is approximately 70 MHz. The pulse amplitude and pulse shape are highly stable from pulse to pulse.

Projected pulse 16 includes pulsed-laser photons. The laser pulse of photons are used as "pump" photons in nonlinear crystal (NLC) 14. In NLC 14, a portion of these "pump" photons may be parametrically down-converted into quantum entangled "signal" (S) and "idler" (I) pairs of photons. Another portion of these pump photons pass through NLC 14 in a non down-converted state (P).

Nonlinear crystal 14 is cut to allow parametric down-conversion via colinear, type I phase-matching, non-degenerate, however other cuts are possible. For example, colinear, type II, non-degenerate or degenerate; noncolinear, degenerate, and noncolinear, non-degenerate, type I or type II. The pump pulse photons (P) are assumed as being vertically polarized, and therefore any down-converted signal (S) and idler (I) photons produced will be horizontally polarized. Such signal photons will have a shorter wavelength than the idler photons. Under the type I phase-matching condition, the polarization orientation of the down-converted photons will be of a polarization that is orthogonal to the polarization of the non down-converted pump pulse photons.

An output from NLC (14) is incident on a wavelength selective mirror (WSM) 18 such as a dielectric mirror. The non down-converted pump pulse (P) photons and any signal (S) photons are totally reflected by WSM 18 and are sent to a receiver 20, to be further described. The longer-wavelength idler (I) photons are transmitted through WSM 18 and are sent to a transmitter 22, to be further described.

Both the signal photon (S) and idler (I) photon that are produced by the parametric down-conversion of a pump pulse photon in the nonlinear crystal NLC 14 have wide bandwidths. These wide bandwidths exist because the pump pulse photons have a wide bandwidth, (proportional to the reciprocal of the pulsewidth of the pump pulse), and because of the very large number of different frequency combinations of signal and idler photons allowed by energy conservation and phase matching. Since, quantum mechanically, the signal and idler photons represent a superposition of all allowed possibilities, the bandwidths of the signal and idler photons will be wider than the bandwidth of the pump pulse photons that produced them in NLC 14. Consequently, the time width of both the signal photon and the idler photon will be shorter than the pulsewidth of the pump pulse.

For an assumed case of a 200 femtosecond (FWHM), Gaussian-shaped pump pulse 16 (center wavelength ~390 nm), the time width of both the signal photon (center wavelength ~683 nm) and the idler photon (center wavelength ~909 nm) will be approximately 44 femtoseconds (FWHM). The time profile of both the signal photon and idler photon will be approximately Gaussian.

Different signal photons are created at different times. However, no inherent photon property distinguishes one signal photon from another signal photon (or one idler photon from another idler photon). As they are produced, each signal photon is identical to any other signal photon (same bandwidth, same time width, same center wavelength). Each idler photon is identical with any other idler photon, since (according to Quantum Mechanics) all allowed possibilities are present in superposition in each individual photon, and the possibilities that are allowed do not change from one photon to the next.

Figure 2:
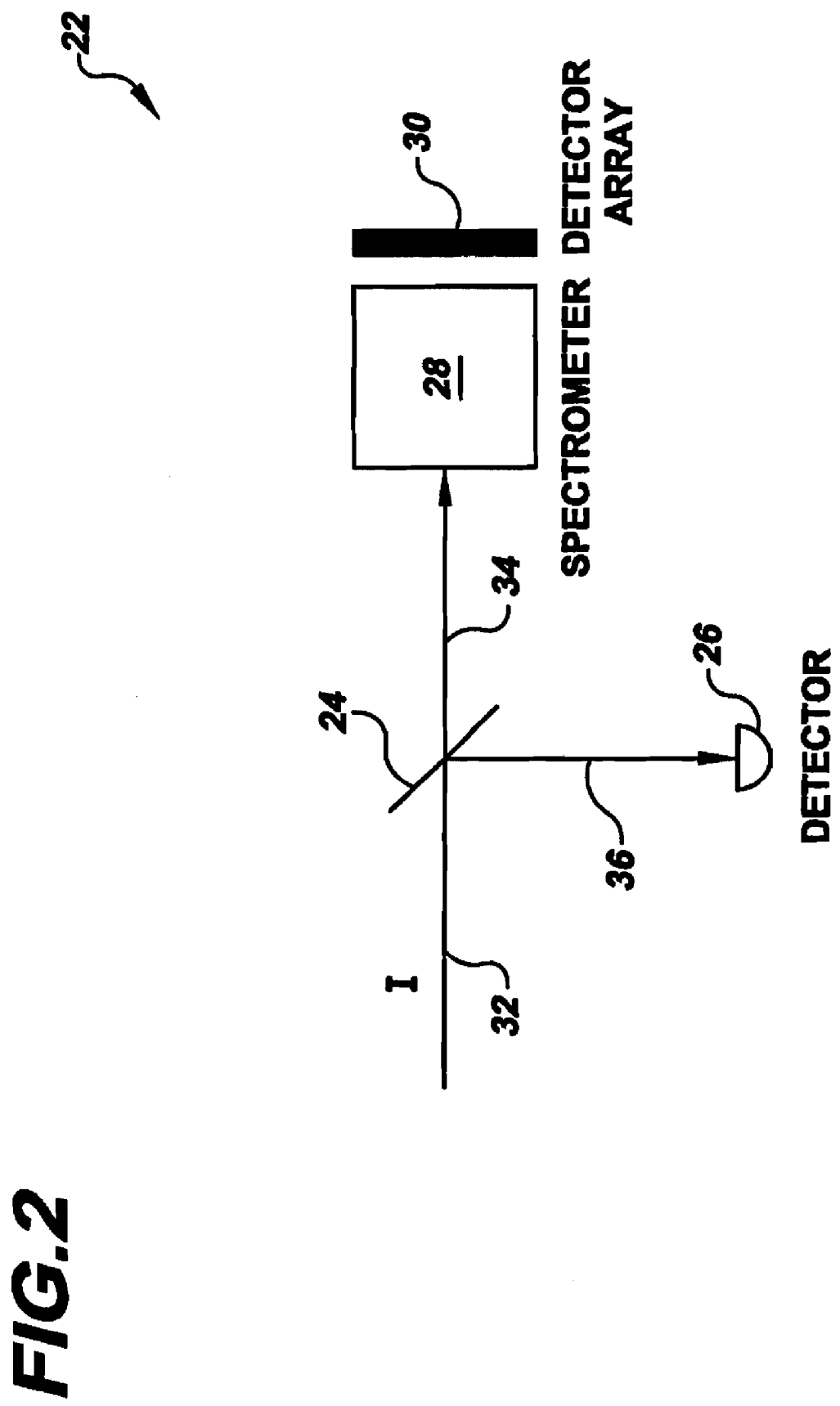
FIG. 2 shows an example transmitter.

Referring to FIG. 2, an example transmitter 22 includes a moveable mirror (MM) 24, a photon detector (PD) 26, a spectrometer 28, and a detector array 30. Moveable mirror 24 can be inserted into or removed from idler photon beam path 32 coming from source 10 of FIG. 1 and may be electro-optically switched.

If moveable mirror 24 is removed, a "collapse" condition beam path 34 results wherein idler photons (I) from source 10 will enter spectrometer 28. In this condition spectrometer 28 and detector array 30 are used to make a precise measurement of the frequency of the idler photons.

If moveable mirror 24 is inserted into the beam path, the idler photons are reflected at mirror 24 and travel a non "collapse" condition path 36 to be incident on photon detector 26. In this case, the idler photons are detected, but their energy is not measured.

Figure 3:
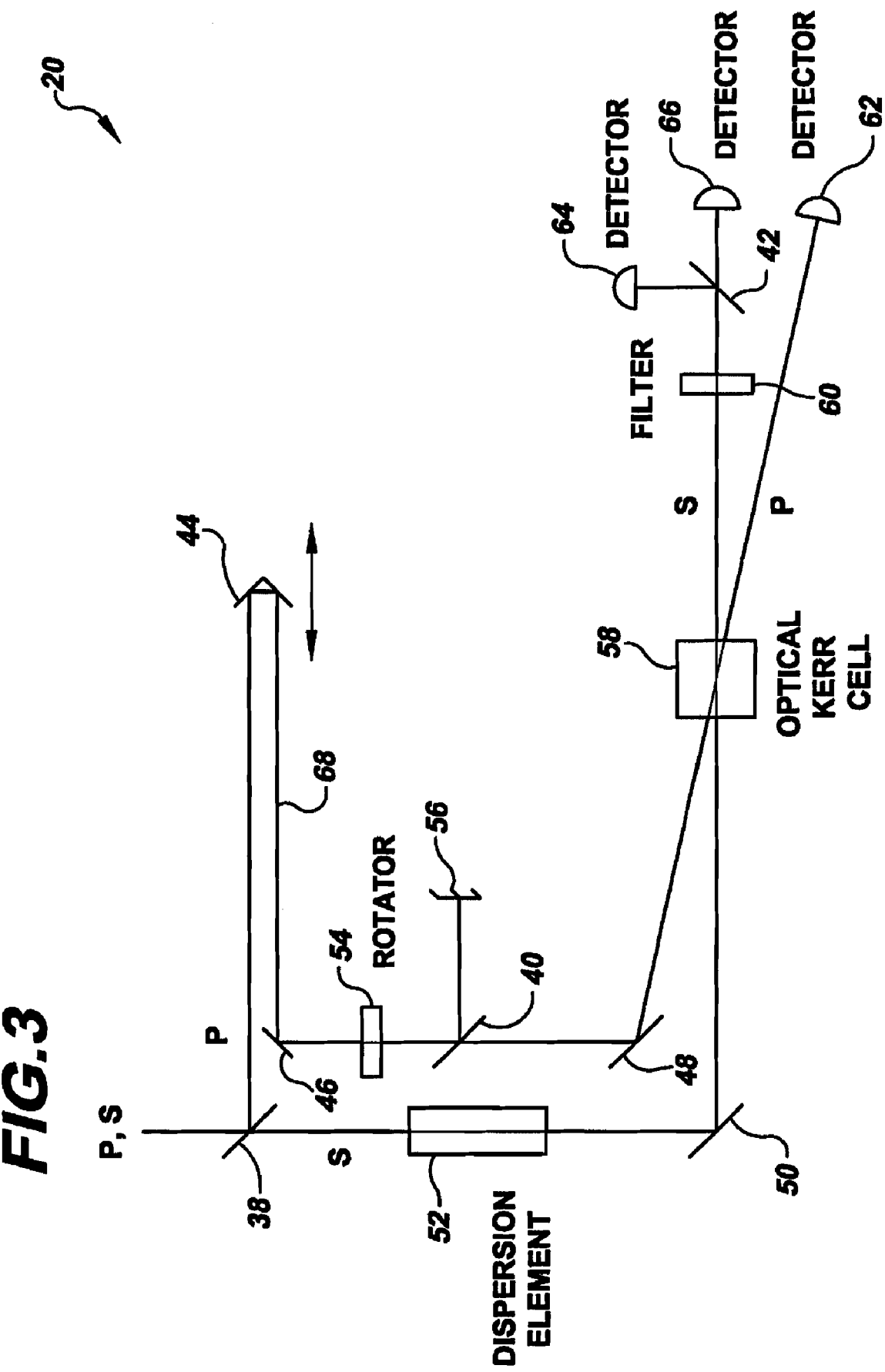
FIG. 3 depicts a communications receiver.

Referring now to FIG. 3, example receiver 20 is to be described first in regard to its components and secondly in regard to its use. Receiver 20 includes three polarizing beam splitters (38, 40 and 42), a corner cube reflector 44, three optical mirrors (46, 48, 50), a nonlinear dispersion element 52, a forty-five degree polarization rotator 54, a beam stop 56, an optical Kerr cell (OKC) 58, one (or more) color filters 60, a photo-diode detector 62, and two photon detectors 64 and 66.

The non down-converted pump pulse (P) photons and the down-converted signal (S) photons from source 10 are incident on first polarizing beam splitter 38 at receiver 20. Polarizing beam splitter 38 reflects the vertically polarized pump pulse (P) photons and transmits the horizontally polarized signal (S) photons.

The pump pulse (P) photons enter an adjustable "mirror delay channel" (68), that includes corner reflector 44 and mirror 46. After reflecting from mirror 46, the pump pulse (P) photons are incident on the forty-five degree polarization rotator 54. The polarization rotator rotates the polarization direction of almost all of the pump pulse (P) photons to an angle that is forty-five degrees from vertical.

The pump pulse (P) photons are next incident on the second polarizing beam splitter 40. This beam splitter has its transmission axis set forty-five degrees from vertical so that almost all of the pump pulse (P) photons are transmitted through this beam splitter. A small number of the pump pulse (P) photons that do not have their polarization direction at forty-five degrees from vertical are reflected by beam splitter 40 and are absorbed by beam stop 56.

The pump pulse (P) photons that have been transmitted through beam splitter 40 are reflected by directing mirror 48 to optical Kerr cell (OKC) 58. The pump pulse (P) photons are incident on the OKC at a small angle from the normal to be further explained.

After passing through polarizing beam splitter 38, the signal (S) photons enter nonlinear dispersion element (DE) 52. The DE is an appropriately cut piece of dispersing material, for example, SF6 glass, and serves to enhance differences between signal photons that have been altered by the communications process and those that have not been, as will be further described.

After exiting element 52, the signal photons (S) are reflected by directing mirror 50 and have near normal incidence on OKC 58. There is approximately a 5 degree difference in angle between the signal (S) photon direction and the pump pulse (P) direction at OKC 58. By providing this divergence, versus an alignment of the pump pulse and signal photon directions, the signal to noise ratio of the receiver is improved, as pump pulse (P) photons are ultimately prevented from reaching photon detectors 64 and 66.

Both the pump pulse (P) and signal (S) photons pass through the optical Kerr cell 58. The intensity in the pump pulse is great enough that it alters the birefringent properties of the liquid in the Kerr cell. In the absence of the pump pulse, the liquid molecules are randomly oriented, and the liquid is optically isotropic: it does not change the polarization direction of light passing through the cell.

In the presence of the intense pump pulse, the liquid molecules in the Kerr cell are aligned in the direction of the polarization of the pump pulse (P) photons (which is forty-five degrees from vertical). This alignment of the liquid molecules causes the liquid to become optically birefringent. If the liquid is, for example, Carbon Disulfide, this birefringence remains through the duration of the pump pulse (P) and for approximately 1.8 picoseconds after the pump pulse (P) exits the Kerr cell.

Signal (S) photons that pass through the Kerr cell while it is optically birefringent have their polarization direction rotated from horizontal to vertical. Signal (S) photons that pass through the Kerr cell while it is optically isotropic are not affected, and their polarization direction remains horizontal.

After passing through optical Kerr cell 58, the pump pulse (P) photons are incident on photo-diode detector 62, which along with its accompanying electronics is used to count the number of pump pulses and to measure the intensity of the pump pulses.

After passing through OKC 58, the signal (S) photons pass through one (or more) color filters 60. The color filter(s) transmit the low frequency signal (S) photons but absorb any pump pulse (P) or other "out of bandwidth" photons that may have entered the signal (S) photon path.

The signal (S) photons next reach the last polarizing beam splitter 42. Signal (S) photons that have had their polarization direction rotated from horizontal to vertical in the optical Kerr cell 58 are reflected at polarizing beam splitter 42 and are incident on vertical photon detector 64. Signal (S) photons that passed through OKC 58 while its liquid was optically isotropic maintain their original, horizontal polarization direction; these photons pass through polarizing beam splitter 42 and reach horizontal photon detector 66. The sensitive photon detectors, with their associated electronics, are capable of photon counting.

The absolute time difference between the arrival of the pump pulse (P) at optical Kerr cell 58 and the arrival of any signal (S) photons at the cell 58 is controlled by the position of corner reflector 44 in the pump pulse (P) path of receiver 20. The arrival time difference can be adjusted by translating the corner reflector.

The "filtering" properties of the Kerr cell in conjunction with the last polarizing beam splitter, pass or do not pass signal photon information depending on the cumulative time distributions of these photons as they correspond to signal photons that have not been altered by a collapse event in the transmitter (binary "zero"), and to signal photons that have been altered by such an event (binary "one") as will be further explained.

Referring to FIGS. 2 and 3, to send a binary "zero" from transmitter 22 to the receiver 20, moveable mirror 24 of the transmitter is inserted into idler (I) photon beam path 32. The idler (I) photons are reflected by mirror 24 and are detected by photon detector 26. This detection does not measure the idler (I) photon energy. The properties of the idler (I) photons are not altered prior to their detection by photon detector 26. Specifically, the center wavelength, bandwidth, and time width of each of the idler (I) photons are the same at the time of detection as they were when the photons were originally created in the down-conversion event in the nonlinear crystal of source 10.

The detection of an idler (I) photon at transmitter 22 serves to "fix" the properties of its quantum-entangled partner, the signal (S) photon that is arriving at receiver 20. Since the center wavelength, wide bandwidth, and short time width of each idler (I) photon were not changed prior to detection in transmitter 22, each signal (S) photon that arrives at receiver 20 also has its original center wavelength, wide bandwidth, and short time width.

A slight uncertainty exists in the arrival time of a given signal (S) photon at the receiver. This is because the group velocity of the signal (S) photons is greater than the group velocity of the pump pulse (P) photons in the nonlinear crystal, and because the pump pulse has a non-zero time width. For the assumed case of a 200 femtosecond (FWHM) pump pulse and an 8 millimeter-long Beta Barium Borate (for example) nonlinear crystal, the arrival time uncertainty of a signal (S) photon at receiver 20 is slightly less than 2 picoseconds with respect to the arrival time of the pump pulse. It should be noted that other nonlinear crystal types besides Beta Barium Borate (BBO) are considered suitable, for example, a crystal of Potassium diHydrogen Phosphate or of Lithium Iodate are feasible.

Signal (S) photons that reach receiver 20 pass through polarizing beam splitter 38 and are then incident on nonlinear dispersion element 52 that has dispersive characteristics that enhance the differences between altered and unaltered signal photons. In this binary "zero" case, all signal (S) photons that arrive at nonlinear dispersion element 52 of receiver 20 have the same center wavelength. Consequently, the group velocity in the nonlinear dispersion element is the same for all of the signal (S) photons, and they all require the same amount of time, on average, to pass through element 52.

Additionally, all signal (S) photons that arrive at receiver 20 have the same time width (~44 femtoseconds, FWHM). Propagation through element 52 causes the time width of the signal (S) photons to increase. This increase is proportional to the inverse square of the initial time width. Assuming a total path length through SF6 glass of ~1 meter, the very narrow initial time width of the signal (S) photons increases to ~12.5 picoseconds (FWHM) after the nonlinear dispersion element.

Figure 4:
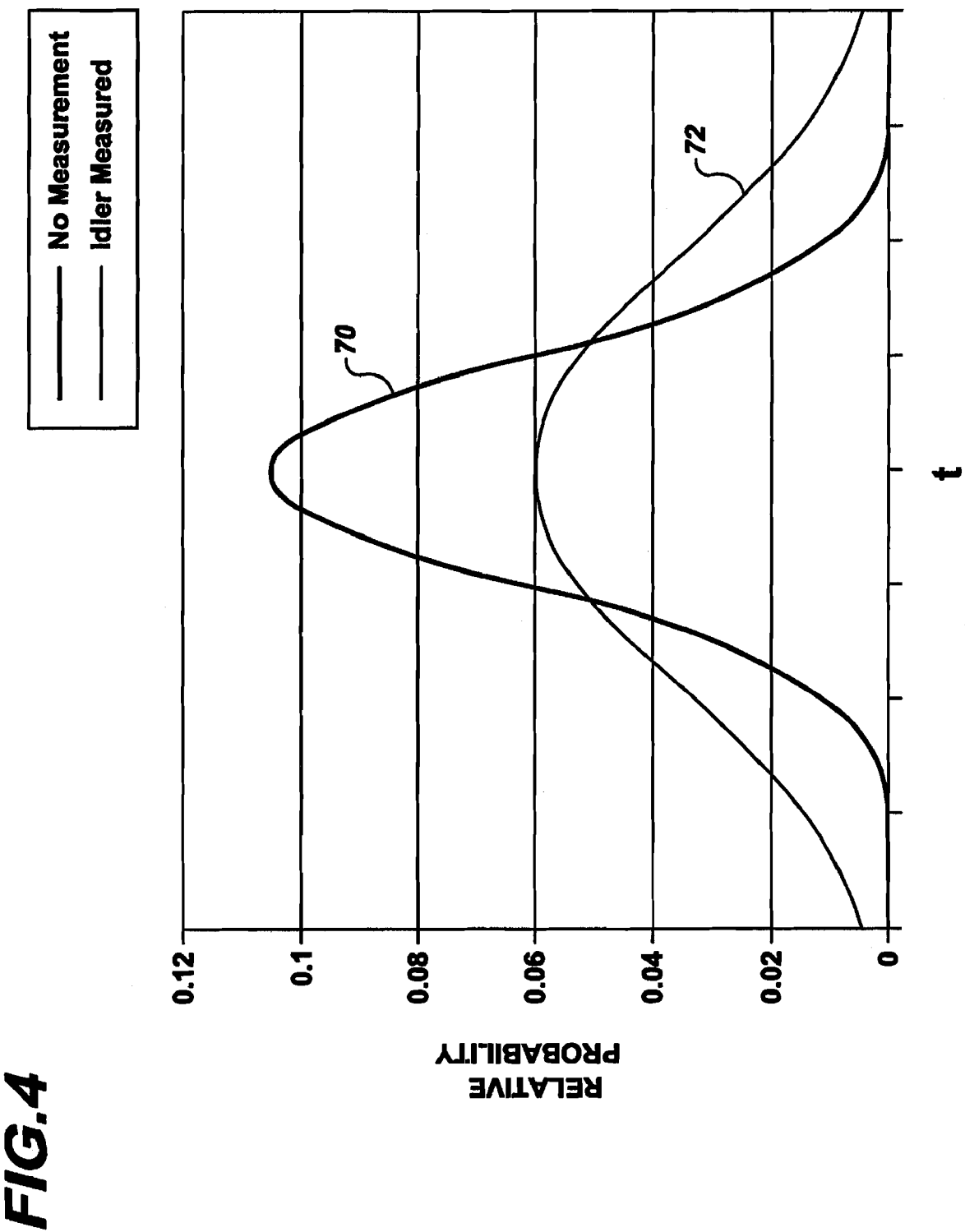
FIG. 4 illustrates cumulative time distributions of signal photons in altered and unaltered states.

Thus, with respect to the arrival time of the narrow pump pulse, any signal photons produced in the nonlinear crystal by that pump pulse arrive at the optical Kerr cell 58 with a Gaussian-shaped cumulative time distribution ~14.5 picoseconds (FWHM), see distribution 70 of FIG. 4.

The liquid in the optical Kerr cell is somewhat dispersive. However, a suitable optical Kerr cell is only about 1 cm in length. Thus the dispersion due to the Kerr cell has only a minor effect on the time properties of the photons passing through it.

By adjusting the position of corner reflector 44 of receiver 20, the arrival time of the pump pulse at cell 58 can be set so that most signal photons pass through OKC 58 before the pump pulse reaches it. Consequently, most of the signal photons representing the binary "zero" case pass through the optical Kerr cell while the cell's liquid is optically isotropic; their polarization direction remains horizontal.

Corner reflector 44 is set so that in the binary "zero" case (no energy measurement at transmitter 22 and hence no collapse event), almost all of the signal (S) photons that reach polarizing beam splitter 42 are horizontally polarized. Consequently, almost all of the signal (S) photons pass through polarizing beam splitter 42 and are detected at photon detector 66. In the binary "zero" case, very few signal photons are detected at photon detector 64.

To send a binary "one" from transmitter 22 to receiver 20, moveable mirror 24 of transmitter 22 is removed from idler photon beam path 32. Idler (I) photons that reach transmitter 22 enter spectrometer 28. Spectrometer 28 and detector array 30 are used to precisely measure the frequency (energy) of each incident idler (I) photon.

Each idler (I) photon is (irreversibly) annihilated in a detection event in one of the elements of detector array 30 of transmitter 22. Thus, spectrometer 28 and detector array 30 restrict each idler (I) photon to a narrow spectral region before it is detected.

Each idler (I) photon is quantum entangled with the signal (S) photon that was created with it in the down-conversion event in nonlinear crystal 14 of source 10 (FIG. 1). The two photons are entangled both in energy and linear momentum (as well as other entangled parameters), because the signal, idler, and pump photons must obey energy conservation and momentum conservation (phase-matching).

A precise measurement of the idler (I) photon's frequency (or wavelength) places a constraint on the allowed signal-photon-frequencies. The precise measurement of the idler (I) photon frequency at transmitter 22 causes an instantaneous "collapse" of the signal (S) photon's bandwidth and, for a majority of the signal photons, an accompanying change in the signal (S) photon's center wavelength. A wide variance in the center wavelength of signal photons experiencing the collapse condition thus occurs.

The source to receiver and source to transmitter distances are set so that this "bandwidth collapse" occurs just before the signal photon reaches the receiver.

The degree to which the signal (S) photon's bandwidth is reduced depends on the original pump pulse bandwidth, on the resolution of the idler frequency measurement, and on the thickness of the nonlinear crystal. The new center wavelength (after the collapse) will be some value falling within the original, "uncollapsed" signal (S) photon bandwidth. The original Gaussian profile of the bandwidth acts as a probability density function (pdf) for the new center wavelength.

Since the precise measurement of the idler (I) photon's frequency causes the bandwidth of the signal (S) photon to decrease, the time width of the signal (S) photon must increase (due to Heisenberg Uncertainty).

For example, by using a 200 femtosecond (FWHM) pump pulse and an 8 millimeter-long BBO crystal, measurement of the idler (I) photon wavelength to within one Angstrom resolution causes the time width of its entangled partner signal (S) photon to increase to a value of approximately 1.4 picoseconds. The time profile of the "collapsed" signal (S) photon depends on the time width of the pump pulse and on the new center wavelength of the signal (S) photon.

The time required for a "collapsed" signal photon to propagate through the nonlinear dispersion element (DE) is determined by the photon's center wavelength and by its time width. The dominant factor impacting this time is the center wavelength, which determines the group velocity of the signal photon in the material of the DE. The initial time width of the signal (S) photon is a secondary factor that controls the amount by which the photon's time width spreads in traveling through nonlinear dispersion element 52. From an initial value of ~1.4 picoseconds in the binary "one" case, the signal (S) photon time width increases to ~1.8 picoseconds, after passing through nonlinear dispersion element 52.

As noted above, the dominant factor in determining the time required for a signal (S) photon to propagate through the nonlinear dispersion element is the photon's center wavelength. The group velocity in the nonlinear dispersion element 52 is a nonlinear function of the center wavelength.

In the binary "one" case, wherein signal photons are altered by the "collapse" event, the center wavelength changes from one signal photon to the next. Because of this, after passing through the nonlinear dispersion element 52, each series of signal photons associated with a pump pulse arrive at the OKC within a slightly skewed, Gaussian-shaped cumulative time distribution ~22 picoseconds (FWHM). FIG. 4 shows an example distribution 72 representing signal photons of this binary "one" case.

Corner reflector 44 of receiver 20 is set so that, in the previously-described binary "zero" case, almost all signal photons pass through OKC 58 ahead of the pump pulse, while the cell liquid is optically isotropic, and their horizontal polarization direction is maintained. The binary "zero" case produces a much larger photon count rate at horizontal photon detector 66 than at vertical photon detector 64.

In the binary "one" case, there is a greater overall cumulative "time spread" of the signal photons exiting nonlinear dispersion element 52 than exists in the binary "zero" case. Thus, there is a much larger probability that signal (S) photons will pass through OKC 58 at the same time as the pump pulse. Consequently, more signal (S) photons pass through the optical Kerr cell 58 while the cell liquid is birefringent. These signal (S) photons have their polarization direction rotated from horizontal to vertical, and they are subsequently reflected by polarizing beam splitter 42 and are detected at photon detector 64.

In the binary "one" case, the photon count rate at photon detector 64 increases to well above the rate observed in the binary "zero" case. Additionally, the count rate at photon detector 66 in the binary "one" case decreases from the rate observed in the binary "zero" case, since the rate of production of signal and idler photon pairs (via parametric down-conversion in the nonlinear crystal) is the same in both the "zero" and "one" cases.

By observing the photon count rate at photon detector 64 versus the rate at photon detector 66, an operator of the receiver can discern whether an operator at the transmitter is sending a binary "zero" or a binary "one".

For sensing situations where there is not apriori information known regarding a specific transmitter, the "transmitter" becomes the media or atmosphere desired to be sensed. This media, which may be atomic, molecular, or of more dense composition, interacts with incident idler photons in an analogous manner to the spectrometer of the transmitter shown in FIG. 2.

Interaction of an idler photon with the media is equivalent to the binary "one" case described above wherein a collapse event is present. Non-interaction of an idler photon with the media is equivalent to the binary "zero" as described above.

Such sensing may be performed by adding a second adjustable "mirror delay channel" to the "front end" of the receiver.

Referring to FIG. 5, a modified receiver 20' incorporating such a second mirror delay channel is shown. Such a second mirror delay channel 74 includes two optical mirrors (76, 78) and a corner reflector 80. The remainder of the receiver is as described in FIG. 3.

The function of the additional mirror delay channel is to control the time at which signal photons and pump pulse photons reach first polarizing beam splitter 38 of receiver 20'.

If the time delay in the new mirror delay channel is set to a too small value, then signal and pump pulse photons arrive at and are detected in the receiver before any idler photons can reach the media to be sensed. This is equivalent to a binary "zero" condition described in regard to receiver 20 above in terms of detection of the signal photons at the receiver.

As the time delay in mirror delay channel 70 is increased, a point is reached where the optical path length from source 10 (FIG. 1) to the media to be sensed is shorter than the optical path length from the source to the receiver. Idler photons will interact with the media to be sensed, before the signal and pump pulse photons reach polarizing beam splitter 38 of the receiver. This is equivalent to the binary "one" condition described in regard to receiver 20 above in terms of detection of the signal photons at the receiver.

In the sensor application, the system can determine whether the media to be sensed is present or absent, the amount of the media that is present—via the percentage of idler photons that interact with the media at a given distance, and the location of the media and its concentration as a function of position—via the translation of the additional corner reflector in the new mirror delay channel of the receiver.

Obviously, many modifications and variations of the invention are possible in light of the above description. It is therefore to be understood that within the scope of the claims, the invention may be practiced otherwise than as has been specifically described.

What is claimed is:

1. An apparatus comprising:
    a pulse source including,
        a pulse generator for generating a pulse of photons;
        a parametric down-converter for receiving said pulse of photons, wherein photons that make up a portion of said pulse of photons are each parametrically down-converted into first and second photons, in which said first and second photons being such that alteration of a characteristic of one of said first and second photons alters a corresponding characteristic in the other of said first and second photons;

a transmitter for receiving said first photons from said pulse source, said transmitter including a collapse event device for selectably altering said characteristic of said first photon; and a receiver for receiving said second photons from said pulse source, said receiver having a detector to detect alteration of said characteristic of said second photon wherein said receiver includes a nonlinear element for enhancing said detection, wherein said parametric down-converter further provides photons, that make up another portion of said pulse of photons, that are non down-converted; and wherein said receiver receives said non down-converted photons to correspond said second photons received by said receiver with said pulse of photons.

2. An apparatus comprising:

a pulse source including, a laser for generating a pulse of photons, a nonlinear crystal parametric down-converter for receiving said pulse of photons, said parametric down-converter providing non down-converted photons from said pulse of photons and parametrically down-converted signal and idler photons from said pulse of photons, said signal and idler photons each having a center wavelength;

a transmitter for receiving said idler photons from said pulse source, said transmitter including a spectrometer for selectably measuring a frequency of said idler photons, said measuring of said frequency providing an alteration to a majority of said idler photon center wavelengths; and a receiver for receiving said signal photons from said pulse source and for receiving said non down-converted photons from said pulse source to correspond said signal photons to said pulse of photons, said receiver having a detector for detecting alteration of said center wavelengths of said signal photons, wherein said detector includes at least one photon detector and a nonlinear element for enhancing detection of said alteration of said center wavelength of said signal photons as received by said receiver.

3. The apparatus of claim 2 wherein said nonlinear crystal includes a Beta Barium Borate crystal.

4. The apparatus of claim 2 wherein said nonlinear element includes dispersive glass.

5. A method comprising:

projecting a pulse of photons through a nonlinear crystal, wherein photons that make up a portion of said projected pulse are each parametrically down-converted into a signal and idler photon pair, said portion resulting in a series of signal photons and a series of idler photons, and wherein photons that make up another portion of said projected pulse are non down-converted, resulting in a series of non down-converted photons corresponding to said projected pulse;

projecting to a receiver said series of signal photons and said series of non down-converted photons;

projecting to a transmitter said series of idler photons, said transmitter having a collapse condition path wherein a majority of center wavelengths of said idler photons is altered, resulting in a corresponding change in a majority of center wavelengths of corresponding signal photons as received at said receiver, and a non-collapse condition path wherein said center wavelengths of said idler photons are left unaltered and wherein said corresponding center wavelengths of said signal photons as received at said receiver are left unaltered; and detecting in said receiver for each projected pulse whether said center wavelengths of said signal photons as received at said receiver have been altered, said step of detecting including projecting said series of signal photons through a nonlinear element and assessing a cumulative time distribution of said series of signal photons as output from said nonlinear element.

6. The method of claim 5 wherein said nonlinear element includes dispersive glass.

7. The method of claim 5 wherein said nonlinear crystal includes a Beta Barium Borate crystal.

8. The method of claim 5 wherein said down-conversion in said nonlinear crystal occurs via colinear, non-degenerate, type I phase-matching.

9. The method of claim 8 wherein said nonlinear crystal is a Beta Barium Borate crystal.

10. The method of claim 5 wherein said second photon has a frequency and wherein said collapse condition occurs when a measurement of said second photon frequency is made.

11. The method of claim 10 wherein said frequency measurement includes using a spectrometer.

12. The method of claim 5 wherein said step of projecting a pulse of photons includes using a laser.

13. The method of claim 5 wherein purposeful alteration of said center wavelengths of said idler photons and a lack of purposeful alteration of said center wavelengths of said idler photons is used for communication.

* * * * *